United States Patent [19]

Sekiguchi

[11] Patent Number: 4,928,238
[45] Date of Patent: May 22, 1990

[54] SCALAR DATA ARITHMETIC CONTROL SYSTEM FOR VECTOR ARITHMETIC PROCESSOR

[75] Inventor: Sunao Sekiguchi, Tokyo, Japan
[73] Assignee: NEC Corporation, Tokyo, Japan
[21] Appl. No.: 69,102
[22] Filed: Jul. 2, 1987
[30] Foreign Application Priority Data Jul. 4, 1986 [JP] Japan .................... 61-158221

[51] Int. Cl.⁵ .............. G06I 15/347; G06I 15/16; G06I 12/00
[52] U.S. Cl. ................. 364/200; 364/232.21; 364/232.9; 364/251.1; 364/254.8; 364/736
[58] Field of Search ... 364/200 MS File, 900 MS File, 364/736

[56] References Cited

U.S. PATENT DOCUMENTS

| 4,594,682 | 6/1986 | Drimak | 364/900 |
|---|---|---|---|
| 4,712,175 | 12/1987 | Torii et al. | 364/200 |
| 4,713,752 | 12/1987 | Tone | 364/200 |
| 4,739,472 | 4/1988 | Hayashi | 364/200 |
| 4,740,893 | 4/1988 | Buchholz et al. | 364/200 |
| 4,745,547 | 5/1988 | Buchholz et al. | 364/200 |
| 4,760,545 | 7/1988 | Imagami et al. | 364/200 |
| 4,794,518 | 12/1988 | Mizushima | 364/200 |

FOREIGN PATENT DOCUMENTS 59-114677 7/1984 Japan .
61-25274 2/1986 Japan .

OTHER PUBLICATIONS

IBM System Journal vol. 25, No. 1, 1986 "The IBM System/370 Vector Architecture" by W. Buchholz.

Primary Examiner—Thomas C. Lee
Attorney, Agent, or Firm—Foley & Lardner, Schwartz, Jeffery, Schwaab, Mack, Blumenthal & Evans

[57] ABSTRACT

A vector arithmetic processor includes a register file for storing an operand of an instruction supplied from a CPU, at least one pointer register for storing address data for the register file, and a scalar control register for storing a signal representing whether an operand is a vector or scalar operand. This at least one pointer register is arranged such that the current value is retained and fed back and the fed back value is used in the second and subsequent cycles when the value of the scalar control register represents a scalar value.

4 Claims, 2 Drawing Sheets

SCALAR DATA ARITHMETIC CONTROL SYSTEM FOR VECTOR ARITHMETIC PROCESSOR

BACKGROUND OF THE INVENTION

The present invention relates to a scalar data arithmetic control system for a vector arithmetic processor in a data processing system.

FIG. 1 is a block diagram showing a conventional vector arithmetic processor in relation to a central processing unit (to be referred to as a CPU hereinafter). In FIG. 1, the vector arithmetic processor 100 includes an instruction register 6, a register file 4, an arithmetic unit 10, and a control unit 90. In operation an operand pointer is set based on the content of a vector instruction when the vector instruction is set in an instruction register 6 by the CPU and the vector arithmetic processor 100 initiates execution of the vector instruction. After the CPU 60 sets the instruction in the instruction register 6, an operand for performing the first cycle of the instruction is loaded. When the last operand is loaded, the CPU 60 loads the operand using a microinstruction for setting an operand counter. When the vector arithmetic processor 100 detects that the operand counter has been set, the operand is used to initiate an arithmetic operation.

When the designation for the vector arithmetic processor 100 is completed, the CPU 60 designates initiation of the second cycle. Even if the operand is a scalar operand, the same operand as in the first cycle is loaded. Upon completion of operand loading, the operand counter is set.

Even if a scalar operand is used, the same data is loaded every cycle. The difference between the scalar and vector operands is designated by a software instruction, and the CPU 60 determines the difference by detecting a designation bit In the conventional vector arithmetic processor described above, the CPU must load the same operand in the vector arithmetic processor every vector instruction cycle, the number of steps in the microprogram is increased. The vector arithmetic processor must wait until the operand is input thereto. As a result, an operation speed cannot be increased.

SUMMARY OF THE INVENTION

It is an object of the present invention to provide a scalar data arithmetic control system for a vector arithmetic processor wherein the conventional drawbacks described above can be eliminated and the operation speed can be increased although the arrangement is simple.

A scalar data arithmetic control system for a vector arithmetic processor according to the present invention comprises, in the vector arithmetic processor capable of performing arithmetic operations independently of a CPU under the control of the CPU, a register file for storing an operand when a vector instruction sent from the CPU is executed, an operand pointer register for storing address data for the operand stored in the register file, an operand counter which is incremented when the operand is loaded in the register file and decremented when the vector instruction is executed, and a scalar control register for storing a value representing whether the operand is a scalar or vector operand. The value of the scalar control register is detected as a value for a scalar arithmetic operation, and the same value as that of the first cycle is used in the operand pointer register in the second and subsequent cycles so as to perform scalar arithmetic operations. The CPU does not load the operand in the register file but sets only the operand counter.

DETAILED DESCRIPTION OF THE PREFERRED EMBODIMENT

A preferred embodiment of the present invention will be described in detail with reference to the accompanying drawing.

Figure 1:
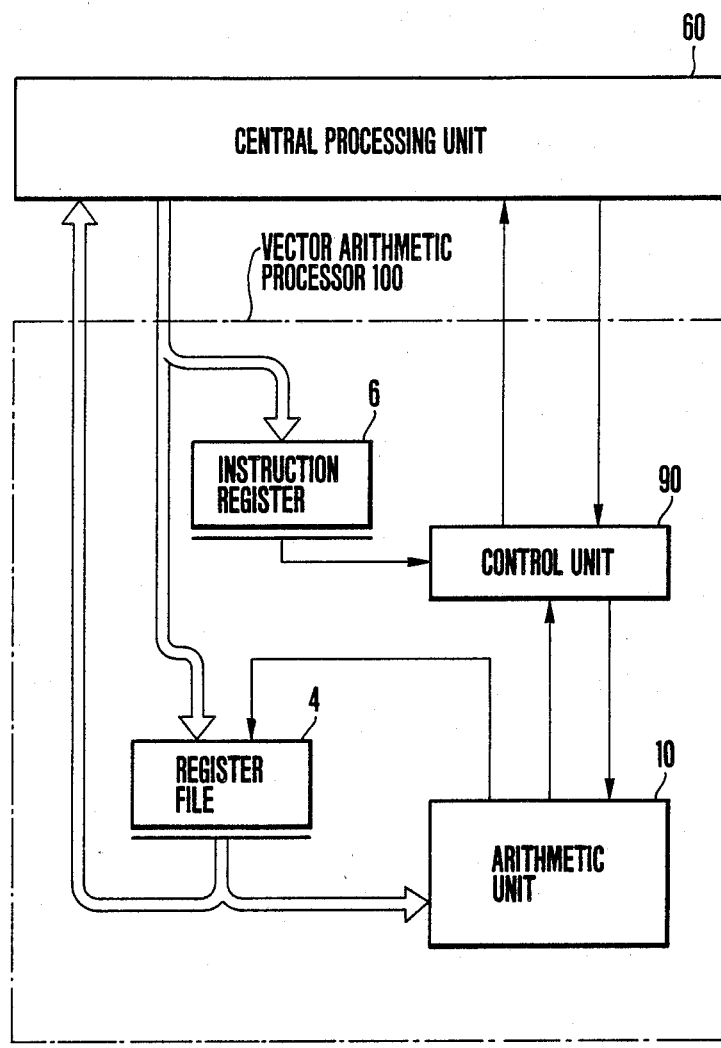
FIG. 1 is a block diagram showing a conventional scalar data arithmetic control system.
Figure 2:
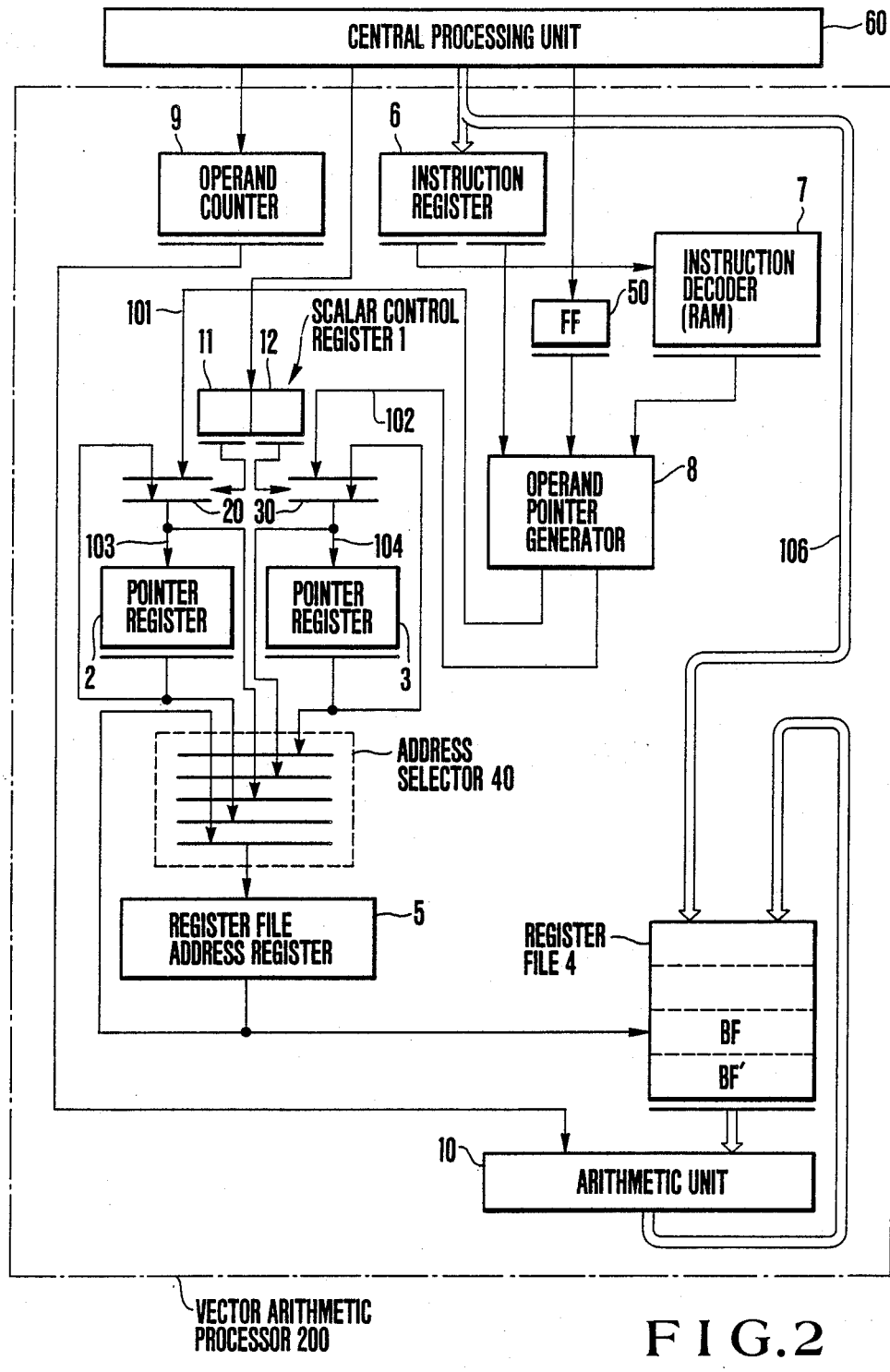
FIG. 2 is a block diagram showing a scalar data arithmetic control system according to an embodiment of the present invention.

FIG. 2 is a block diagram showing an embodiment of the present invention.

In a vector arithmetic processor 200, a scalar control register 1 is connected to a CPU 60 and stores a signal representing whether the operand is a scalar or vector operand. The scalar control register 1 comprises an operand register 11 for storing a 1-bit first operand and an operand register 12 for storing a 1-bit second operand. Outputs from the operand registers 11 and 12 are controlled by operand selectors 20 and 30, respectively. A pointer register 2 is connected to the output of the operand selector 20 and stores first operand address data for a register file 4. A pointer register 3 stores second operand address data for the register file 4. The register file 4 stores operand data supplied from the CPU 60 through a bus 106 and stores the processed results from an arithmetic unit 10. In this embodiment, the register file 4 comprises a 16-word register file and comprises two pairs of 4-word register file areas (BF at addresses $8_{HEX}$ (where HEX is the hexadecimal notation) to $B_{HEX}$ and BF' at addresses $C_{HEX}$ to $F_{HEX}$) for storing operand data from the CPU 60. The register file areas BF and BF' are switched by a flip-flop 50 which is inverted at the initiation of instruction execution and are alternately used. Therefore, the CPU 60 can send the next operand in the register file 4 while the current operand is being executed.

The vector arithmetic processor 200 comprises an operand counter 9 set in response to a control signal from the CPU 60. An output from the vector arithmetic processor 200 is coupled to the arithmetic unit 10.

Outputs from the pointer registers 2 and 3 and the selectors 20 and 30 are coupled to an address selector 40. A register file address register 5 is coupled to an output from the address selector 40 and supplies an address signal to the register file 4. The output terminal of the address register 5 is connected to one input terminal of the address selector 40. An instruction register 6 stores an instruction code and the necessary operand control data, both of which are supplied from the CPU 60, and supplies the instruction code as an address signal to an instruction decoder 7. The instruction decoder 7 comprises a RAM and stores data required for instruction execution. The operand control data of the instruction register 6 is output to an operand pointer generator 8. Two outputs from the operand point generator 8 are supplied to the first input terminals of the operand selectors 20 and 30, respectively. Outputs from the pointer registers 2 and 3 are coupled to the second input terminals of the operand selectors 20 and 30, respectively.

Due to the above mentioned electrical connections, the operand pointer generator 8 receives an output from the instruction register 6 and an output from the instruction decoder 7 and generates the first and second operand address data for the register file 4.

The operand selectors 20 and 30 respectively receive outputs from the operand pointer generator 8 through signal lines 101 and 102 when the value of the scalar control register 1 represents a vector arithmetic operation (i.e., logic "0"). In this case, outputs of the operand selectors 20 and 30 appear on signal lines 103 and 104, respectively. The operand selectors 20 and 30 select first and second operand pointers stored in the operand pointer registers 2 and 3 when the value of the scalar control register 1 represents a scalar arithmetic operation (i.e., logic "1").

The address selector 40 outputs the values selected by the operand selectors 20 and 30 to the register file address register 5.

An arithmetic operation will be described in which two operand data are received from the CPU 60 and are added to each other, and a sum Xi is repeatedly supplied to the CPU 60:

$$X_i \leftarrow A_i + B_i \ (i=1 \text{ to } n) \qquad (1)$$

where Ai is the first operand and Bi is the second operand.

Assume that the first operand Ai is a scalar operand and the second operand Bi is a vector operand.

A vector addition instruction is set in the instruction register 6 under the control of the CPU 60. At this time, the scalar control register 1 is set at logic "0", which indicates that the operand is the vector operand. The values of the signal lines 101 and 102 appear on the signal lines 103 and 104, respectively. The operand data storage area BF of the register file 4 is selected (the value of the register switching flip-flop is "0"). The address data of the first operand Ai on the signal line 101 is set as "8"$_{HEX}$ in the register file area BF by the instruction register 6 and the instruction decoder. The address data of the second operand Bi on the signal line 102 is set as "A"$_{HEX}$. When the first cycle of the present instruction is initiated, the vector arithmetic processor 200 sets the above address data in the pointer registers 2 and 3.

After the CPU 60 sets the instruction, data of the first operand Ai and data of the second operand Bi are loaded by the CPU 60 through the bus 106 at addresses "8"$_{HEX}$ and "A"$_{HEX}$ of the register file 4, respectively. Upon completion of loading, the operand counter 9 is incremented by one.

When the vector arithmetic processor 200 detects that the operand counter 9 has been set, the vector arithmetic processor 200 initiates an addition using the two operands set in the register file 4. At the same time, the operand counter 9 is decremented by one. Meanwhile, the CPU 60 determines whether the operand is a scalar or vector operand. If the first operand Ai is a scalar operand, the bit of the operand register 11 in the scalar control register 1 is set at logic "1". Therefore, the value of the pointer register 2, i.e., the output from the selector 20, is output to the signal line 103.

When the CPU 60 designates initiation of the second cycle of the vector instruction, the flip-flop 50 is inverted to logic "1", and the register file area BF' out of the areas BF and BF' in the register file 4 is selected. The first operand signal line 101 is set to a value corresponding to address "C"$_{HEX}$ of the register file 4, and the second operand signal line 102 is set to a value corresponding to address "E"$_{HEX}$ of the register file 4.

However, since the register 11 of the scalar control register 1 is set at logic "1", the signal line 103 is set to a value corresponding to "8"$_{HEX}$. At the time of initiation of the second cycle, values "8"$_{HEX}$ and "E"$_{HEX}$ are respectively set in the pointer registers 2 and 3. Since the operand Ai is scalar data, the CPU 60 uses the data of the first cycle for the operand Ai in the second cycle. The CPU 60 loads only the data of the second cycle for the second operand Bi at address "E"$_{HEX}$ of the register file 4 through the bus 106. The operand counter 9 is incremented by one.

After the vector arithmetic processor 200 detects that the operand counter 9 has been set, the vector arithmetic processor 200 uses the data of the first operand of the first cycle stored at address "8"$_{HEX}$ of the register file 4 and the data of the second operand Bi sent in the second cycle and stored at address "E"$_{HEX}$ and adds these data. Upon completion of this addition, the operand counter 9 is decremented by one. In the third cycle, the pointer register 2 is set to "8"$_{HEX}$ and the pointer register 3 is set to "A"$_{HEX}$. Only the data of the second operand Bi is sent, and the same arithmetic operation as described above is performed.

An arithmetic operation is performed according to relation (1) in which both the first and second operands Ai and Bi are scalar operands.

In the first cycle, the value "8"$_{HEX}$ is set in the pointer register 2, and the value "A"$_{HEX}$ is set in the pointer register 3. Data of the first and second operands Ai and Bi are loaded in the register file 4. Since both the operands are scalar operands, both bits of the scalar control register 1 are set at logic "1". The output from the pointer register 2 appears on the signal line 103, and the output from the pointer register 3 appears on the signal line 104.

In the second cycle, the operand data need not be sent. The CPU 60 sets only the operand counter 9. When the vector arithmetic processor 200 detects that the operand counter 9 has been set, the processor 200 adds data at addresses "8"$_{HEX}$ and "A"$_{HEX}$ of the register file 4.

In the third and subsequent cycles, the operand data is not loaded, and only the operand counter is set.

According to the present invention as described above, the operand is recognized as a scalar operand and the same operand data is repeatedly used to reduce the number of execution steps of the vector instruction, thereby increasing the arithmetic operation speed.

What is claimed is:

1. A scalar data arithmetic control system for a vector arithmetic processor for performing vector arithmetic operations independently of a central processing unit under the control of said central processing unit, said vector arithmetic processor comprising:

a register file for storing an operand supplied from said central processing unit when a vector operation instruction is to be executed;

pointer register means for storing and outputting to said register file address data for said operand stored in said register file;

an operand counter for counting operands supplied from said central processing unit to said register file, a count of said operand counter being incremented when said operand is loaded in said register file and decremented when said vector operation instruction is executed; and a scalar control register for storing a value representing whether said operand is a scalar or vector operand, said value being determined by said central processing unit on the basis of said vector operation instruction and supplied therefrom to said scalar control register; said pointer register means being coupled to said scalar control register; wherein when said value stored in said scalar control register is representative of an operand being scalar, second and subsequent cycles of the arithmetic operations are performed using same address data outputted from said pointer register means for said operand as that used in a first cycle of the arithmetic operations so as to perform scalar arithmetic operations, and said central processing unit sets only said operand counter in place of loading of said operand in said register file.

2. A system according to claim 1, wherein said pointer register means includes at least one pointer register controlled in response to an output from said scalar control register, said at least one pointer register receiving an output of itself when the value of said scalar control register is representative of said operand being scalar.

3. A system according to claim 2, wherein said pointer register means further comprises:

means for generating address data for said operand in said register file on the basis of said vector operation instruction supplied from said central processing unit; and selector means for inputting said address data output from said address data generating means and a signal output from said at least one pointer register to select the address data input at every cycle when the output from said scalar control register is representative of said operand being a vector, and when the output from said scalar control register is representative of said operand being scalar, for selecting said address data output from said address data generating means for only a first cycle and said signal output from said at least one pointer register for second and subsequent cycles, said selector means outputting a selected signal to said at least one pointer register and said register file.

4. A system according to claim 3, wherein said register file is divided into two blocks for alternately storing, in units of arithmetic operations, operands sent from said central processing unit, one of said two blocks storing a maximum of two operands; and said at least one pointer register includes a first operand pointer register for storing an address at which said first operand is stored and a second operand pointer register for storing an address at which said second operand is stored.

* * * * *